(12) United States Patent
Yang et al.

(10) Patent No.: US 8,237,879 B2
(45) Date of Patent: Aug. 7, 2012

(54) PIXEL STRUCTURE, LIQUID CRYSTAL DISPLAY AND OPERATION METHOD THEREOF

(75) Inventors: Sweehan J. H. Yang, Tainan (TW); Po-Sheng Shih, Hsinchu (TW)

(73) Assignee: Hannstar Display Corp., Taipei (TW)

( * ) Notice: Subject to any disclaimer, the term of this patent is extended or adjusted under 35 U.S.C. 154(b) by 688 days.

(21) Appl. No.: 12/453,408

(22) Filed: May 11, 2009

(65) Prior Publication Data
US 2009/0284678 A1    Nov. 19, 2009

(30) Foreign Application Priority Data

May 15, 2008  (TW) .................................. 97117921 A

(51) Int. Cl.
*G02F 1/136* (2006.01)
(52) U.S. Cl. .............................. 349/46; 349/92; 349/177
(58) Field of Classification Search .................. None
See application file for complete search history.

(56) References Cited

U.S. PATENT DOCUMENTS

| 6,005,646 A | * | 12/1999 | Nakamura et al. | ............... 349/33 |
| 2008/0024468 A1 | * | 1/2008 | Yang et al. | ..................... 345/204 |
| 2011/0122054 A1 | * | 5/2011 | Shimizu et al. | ................. 345/87 |

FOREIGN PATENT DOCUMENTS

JP  2007334372 A  * 12/2007

* cited by examiner

*Primary Examiner* — Hemang Sanghavi
(74) *Attorney, Agent, or Firm* — Bacon & Thomas, PLLC

(57) ABSTRACT

The present invention discloses a liquid crystal display containing a plurality of liquid crystals, a switching element, a plurality of alignment layers and a plurality of electrodes. The switching element comprises a gate, a drain and a source, and the drain/source forms a directional top portion. The gate and the source/drain form a lateral electric field. The alignment layer is disposed on the switching element and corresponds with the directional top portion. The plurality of liquid crystals are operated by the lateral electric field and located above the electrodes and the alignment layers. The alignment direction of plurality liquid crystals is following the directional top portion due to the enhancement of liquid crystal phase transition. Enhancement of the lateral electric field between the plurality of electrodes is helpful to reduce liquid crystal phase transition time.

19 Claims, 8 Drawing Sheets

PIXEL STRUCTURE, LIQUID CRYSTAL DISPLAY AND OPERATION METHOD THEREOF

BACKGROUND OF THE INVENTION

1. Field of the Invention

The present invention relates to a liquid crystal display; in particular, to a liquid crystal display having pixels with switching element design.

2. Description of the Related Art

In recent years, Liquid Crystal Display (LCD) has been widely employed in various electrical products because of its advantages in lightness, slimness, low radiation, reduced power consumption, presenting a significant trend of gradually replacing a conventional Cathode Ray Tube (CRT). LCD uses liquid crystal rotation to control the transparency in the display device, which needs to apply a wide angle of view technology to improve disadvantage of a narrow angle of view; whereas the increase in an angle of view causes reduction in contrast and a gray level error, which problems being inevitable along with the development of large scaled LCD.

Liquid crystal does not belong to categories of solid, liquid and gas states, which is a material between solid and liquid states; in terms of molecular arrangement, liquid crystal presents highly regular alignment, and for optical properties, liquid material has isotropic property, while solid crystal shows regularity in its structure; thus liquid crystal has a certain degree of freedom of liquid material, retaining special optical property of anisotropic similar to solid crystal, and presenting features of polarity and conductance. According to liquid crystal molecule arrangement, it can be classified into smectic liquid crystal, nematic liquid crystal and cholesteric liquid crystal. An alignment film is primarily made of Polyimide (PI) with a thickness between about 500 Å~1000 Å; under rubbing actions or based on alignment process irradiated by ion beams, the alignment film generates long-chain Alkyl and long-chain Fluoroalkyl along the side chain or terminal of Polyimide, making liquid crystal molecules form a prescribed angle of inclination, referred as a present inclination angle, in a fixed direction according to the long-chain Alkyl and long-chain Fluoroalkyl. Before the alignment process, the side chains or terminals of Polyimide present an arbitrary arrangement; after the alignment process, whereas, under mechanical force or lighting, the side chains or terminals of Polyimide show a forward alignment in the alignment direction, and liquid crystal molecules accordingly form an arrangement at the preset inclination angle along the glass substrate.

Currently, amorphous silicon display devices use the twist nematic liquid crystal, in which the liquid crystal material of high resistance and high reliability employs an Np-typed liquid crystal mixture composed of fluorine series liquid crystal molecules and olefin series end groups, with there in such a liquid crystal mixture added a few percents of asymmetric optic active agent. Referring to FIG. 1 (prior art), an Optical Compensated Bend (OCB) disclosed in U.S. Pat. No. 6,933,916B2 is shown, wherein the pixel 1 of the liquid crystal display device comprises a gate line 11, a pixel area 12 and a protrusion 13. At present, in order to solve the issue of liquid crystal response rate, it is accomplished by presenting splay alignment while no voltage being applied, but becoming bend alignment while a certain voltage being applied (transition voltage). As the OCB uses such a bend alignment to perform switching actions, the time required for alignment change is shorter due to the flow effect in liquid crystal layer, and response speed rendered therein is significantly faster. It primarily uses the gate line 11 to divide the pixel area 12 into two electrical fields, enhancing electrical field power to enable uniform distribution of liquid crystal transformation in the pixel area 12 and to increase response speed of the liquid crystal phase transition. The protrusion 13 located on the gate line can control the liquid crystal transformation direction in these two electrical fields. The $\pi$ cell of the general gap cell, the formation of bi-axial film, in conjunction with the feature of the wide angle of view in such a cell, it is hence possible to implement the capability of high gray-level display, and the response time for such a cell can be 10 times higher than general twist nematic (TN) cell, allowing a fast response speed of 2~8 msec. Therefore, under the circumstances that all these conditions can be satisfied, it is possible to fully exploit the advantages of color technology, allowing liquid crystal display devices to realize the practice of no blurred image and obscure boundary. However, such a technology compromises at the price of size of opening rate in the pixel area. The present invention principally takes the opening rate in the pixel area 12 and the response speed of liquid crystal phase transition into consideration.

In view of the above-mentioned issues found in prior art, for appropriate resolutions thereof, the inventors of the present hereby propose a liquid crystal display device based on long-term professional researches and developments and experiences in field practice as the base for improving the drawbacks illustrated supra.

SUMMARY OF THE INVENTION

Accordingly, the objective of the present invention is to provide a liquid crystal display device which uses the improved design of a switching element pixel to create more desirable image quality.

In accordance with the objective of the present invention, a pixel structure is provided, comprising a substrate, a pixel, a plurality of liquid crystals, a switching element, a plurality of alignment films and a plurality of electrodes, wherein the pixel is located on the substrate, the switching element is located on the pixel, comprising a gate, a drain and a source, and the drain/source forms a directional top portion, and the gate, the drain and the source conjunctively form a lateral electrical field.

The present invention further provides a liquid crystal display device, comprising a first substrate, a second substrate, at least one pixel, a plurality of liquid crystals and a switching element. Herein the first substrate and the second substrate form a longitudinal electrical field. The pixel is located between the first substrate and the second substrate. The switching element has a bottom gate structure, in which a gate and a drain/source form a lateral electrical field, and the drain/source forms a directional top portion.

Furthermore, the present invention further provides a liquid crystal display device, comprising a first substrate, a second substrate, at least one pixel, a plurality of liquid crystals, a switching element and a plurality of electrodes. Herein, the first substrate and the second substrate form a longitudinal electrical field. The pixel is located between the first substrate and the second substrate, and the switching element is located on the first substrate. The switching element comprises a gate and a drain/source to form a lateral electrical field which causes the plurality of liquid crystals to act along the extension plane of the lateral electrical field in horizontal direction. The pixel provides a longitudinal electrical field between the first substrate and the second substrate, and the longitudinal electrical field causes the plurality of liquid crystals to act along the extension plane of the longitudinal electrical field.

While the lateral electrical field is formed, the plurality of liquid crystals act along the horizontal direction of the lateral electrical field, thus creating a first transformation. While the longitudinal electrical field is formed, the plurality of liquid crystals act along the direction of the longitudinal electrical field, thus creating a second transformation.

An operation method for operating a liquid crystal display device in an initiation stage comprises the following steps. In step 1, a liquid crystal display device is provided and the liquid crystal display device comprises a plurality of liquid crystals between a first substrate and a second substrate. A pixel is located on the first substrate and a switching element is located on the pixel. The switching element have a gate and a drain/source and a lateral electrical field is formed between the gate and the drain/source. In step 2, the plurality of liquid crystals are acted by the lateral electrical field. In step 3, the first substrate and the second substrate is provided to form a longitudinal electrical field. And, in step 4, the plurality of liquid crystals is acted by the longitudinal electrical field.

To facilitate better understanding and appreciation of the technical characteristics and achieved effects of the present invention, references are made to the preferred embodiments and detailed descriptions as well as appended drawings of the present invention as illustrated hereunder.

DETAILED DESCRIPTION OF THE PREFERRED EMBODIMENTS

The appended drawings are referred hereunder for setting forth a liquid crystal display device according to a preferred embodiment of the present invention. For better understanding by readers, same components illustrated in the following embodiments are marked with the identical symbols or numbers for descriptions.

Figure 1:
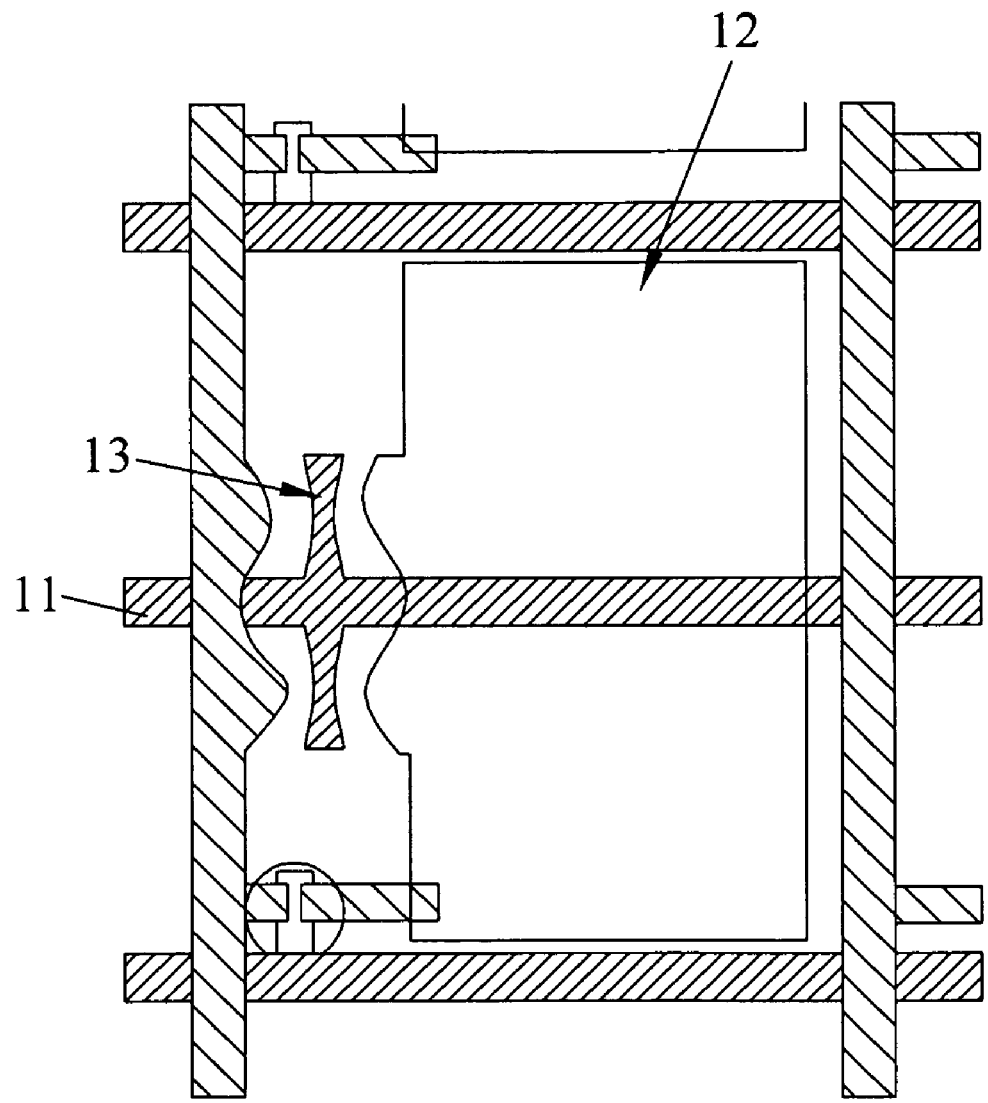
FIG. 1 is a diagram of a pixel in a conventional liquid crystal display device.
Figure 2:
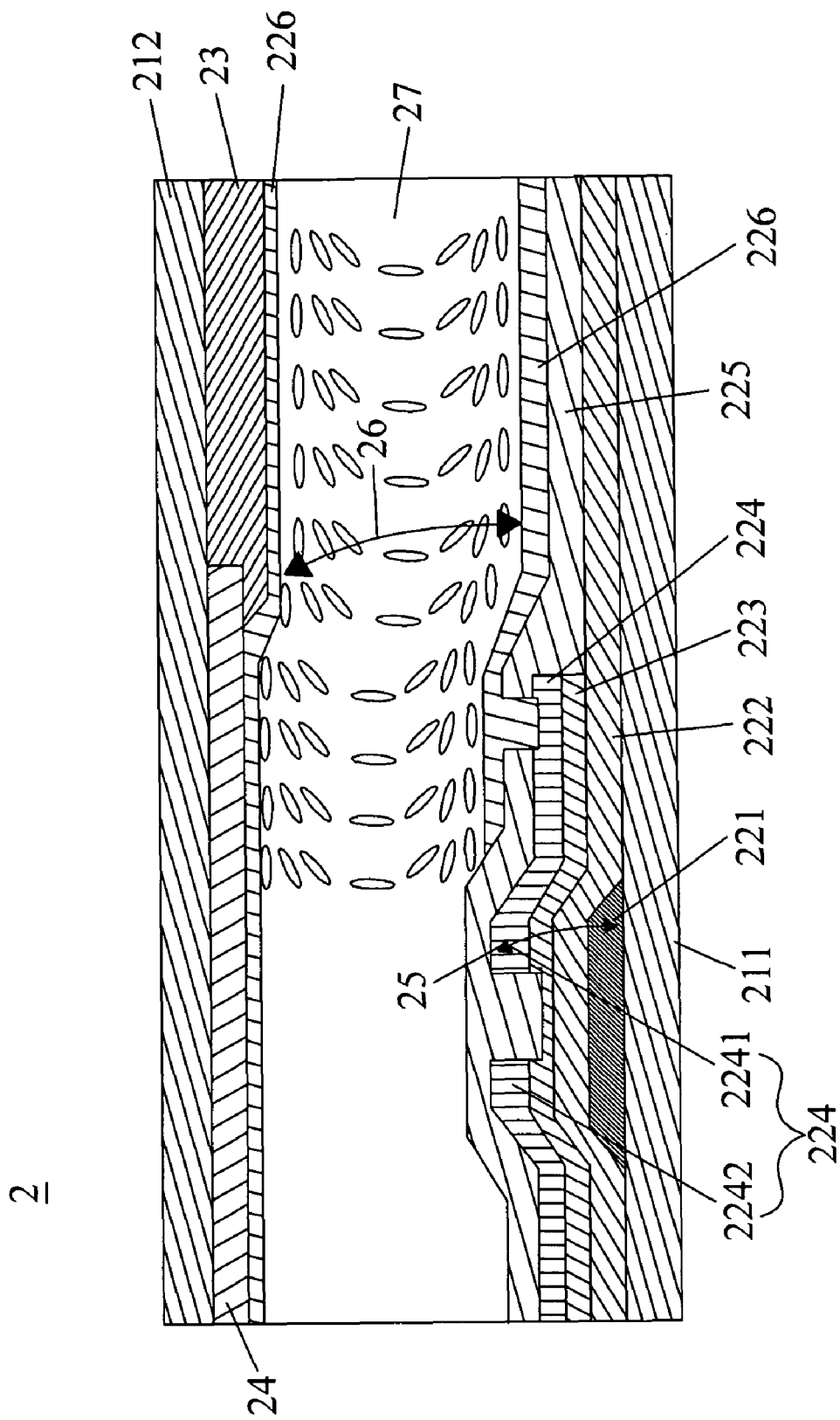
FIG. 2 is a cross-section view of a pixel in a liquid crystal display device according to the present invention.

Referring to FIG. 2 for a cross-section view of a pixel in a liquid crystal display device according to the present invention, the pixel 2 comprises a first glass substrate 211, a second glass substrate 212, a color filter 23, a black matrix 24, a gate 221, a silicon nitride (SiNx) 222, an amorphous silicon 223, a source/drain 224, a passivation 225, an indium tin oxide (ITO) transparent conductive film 226 and liquid crystals 27. Herein the gate 221, SiNx 222, amorphous-Si 223, source/drain 224 and passivation 225 are deposited on the glass substrate by using the thin film deposition method, thereby forming a basic constitution for an amorphous-Si thin film transistor to separate the gate 221 and the amorphous-Si 223; in case that no externally applied voltage exists, the gate 221 does not generate current and thereby no current flows from the source 2241 to the drain 2242; while the gate 221 is applied with a voltage, the amorphous-Si 223 induces electrical charges and the generated electrons at the source 2241 conductively flow from the source 2241 to the drain 2242, such that the original non-conducting switching element 22 becomes open. While a voltage is applied on the gate 221, a lateral electrical field is formed between the gate 221 and the source 2241/drain 2242, and the liquid crystals 27 enter into a twist state due to the influence from such a lateral electrical field 25; subsequently, a longitudinal electrical field 26 is formed between a common voltage of the second glass substrate and a data voltage of the first glass substrate. In the preferred embodiment of the present invention, the gate structure can be a bottom gate structure, and the voltages in the lateral electrical field 25 and the longitudinal electrical field 26 are between about 15 Volts and 60 Volts to achieve the best electrical field effects.

Figure 3:
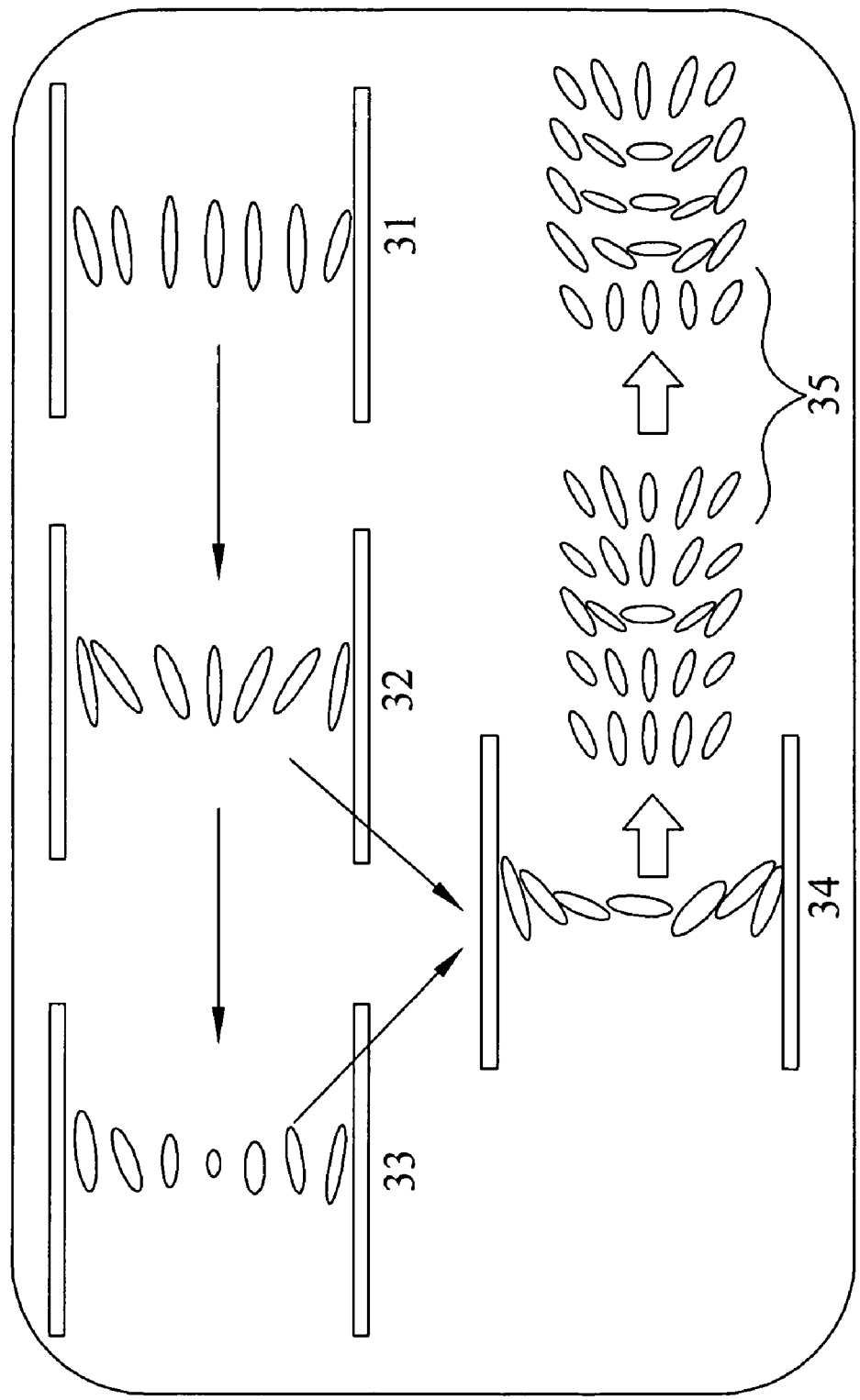
FIG. 3 is a liquid crystal transformation diagram of a pixel in a liquid crystal display device according to the present invention.

Referring to FIG. 3, the arrangement of the liquid crystal transformation 3 is initially in a homogeneous state 31, and liquid crystal presents a splay state along the direction of the longitudinal electrical field, then quickly transforming from a twist state 33 to a bend state 34 and rendering bilateral propagation 35, allowing liquid crystal to operate in a bend state. The above-mentioned liquid crystal action is referred as the Optically Compensated Bend (OCB), which is required to change the phase difference in liquid crystal from 0 to $\pi/2$. Liquid crystal is a kind of birefingence crystal, in which, while light passes through liquid crystal, it generates an ordinary ray with a refraction rate $n_o$ and an extraordinary ray with a different refraction rate $n_e$, such that, as light travels through liquid crystal, due to difference of light courses in the directions of these two different refraction rates, a phase difference is thus generated. However, to keep such a state of $\pi/2$ phase difference, the Optically Compensated Bend (OCB) liquid crystal needs a longitudinal electrical field to maintain the distribution uniformity of a liquid crystal state between the upper and lower glass substrates.

Figure 4:
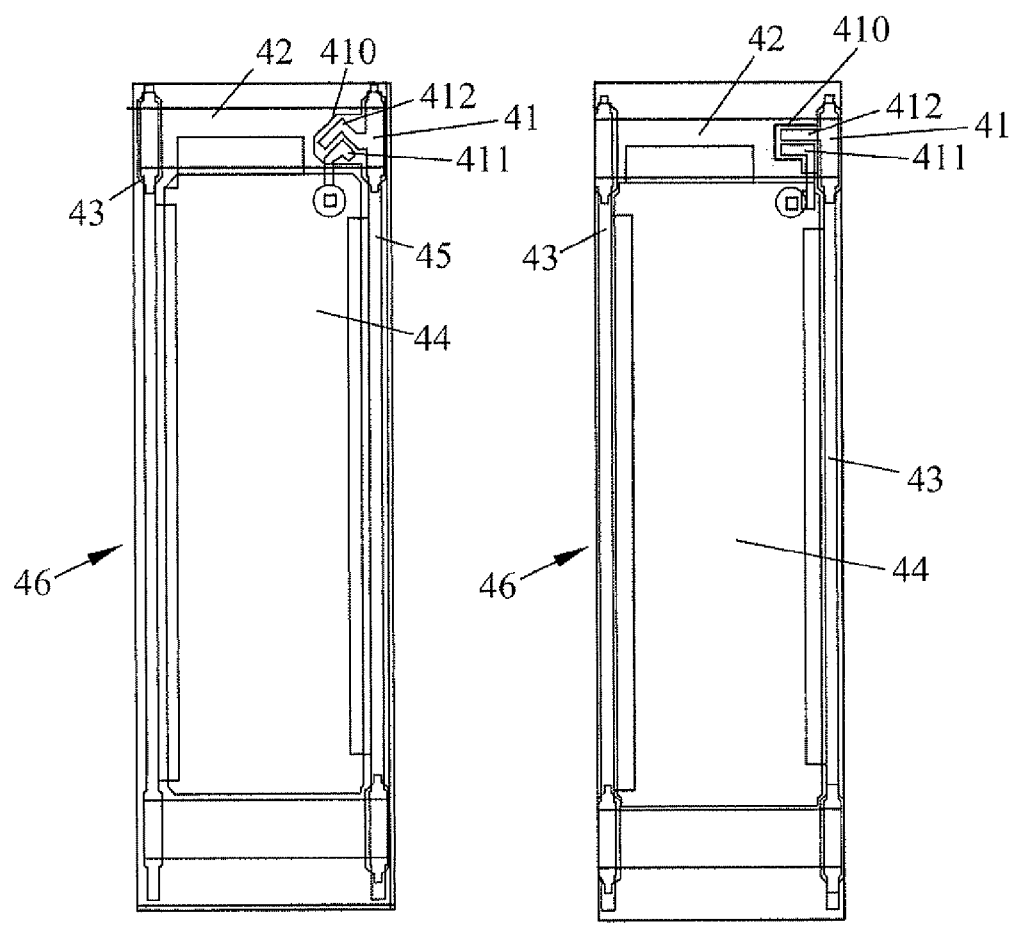
FIG. 4 is a diagram of a pixel in a liquid crystal display device according to the present invention.

Referring to FIG. 4 for a diagram of a pixel structure 4 in a liquid crystal display device according to the present invention, the pixel structure comprises a source/drain 41, a gate line 42, an amorphous-Si 43, an indium tin oxide (ITO) transparent conductive film 44, a data line 45 and a pixel 46. In the Figure, a source 411 is connected to the pixel 46 and a drain 412 is connected to the data line 45, wherein the gate line 42 controls the potential switching, the potential magnitude of the pixel controls rendered color and brightness and the potential of the pixel 46 is provided by the data line 45. However, the source/drain 41 forms a top 410, which top 410 principally increasing the lateral electrical field overlapped between the source/drain 41 and the gate line 42, and quickly transforming the twist state into the bend state. By applying the consistency between the aligned arrangement in the alignment film and the direction of the top 410, it is possible to facilitate the rotation of liquid crystal in the direction of the lateral electrical field, thus accelerating response rate of liquid crystal molecules. In the preferred embodiment of the present invention, the top 410 presents an angle of between about 75 degrees to 105 degrees, thereby achieving the best enhancement effects of the lateral electrical field between the source/drain 41 and the gate line 42.

Figure 5:
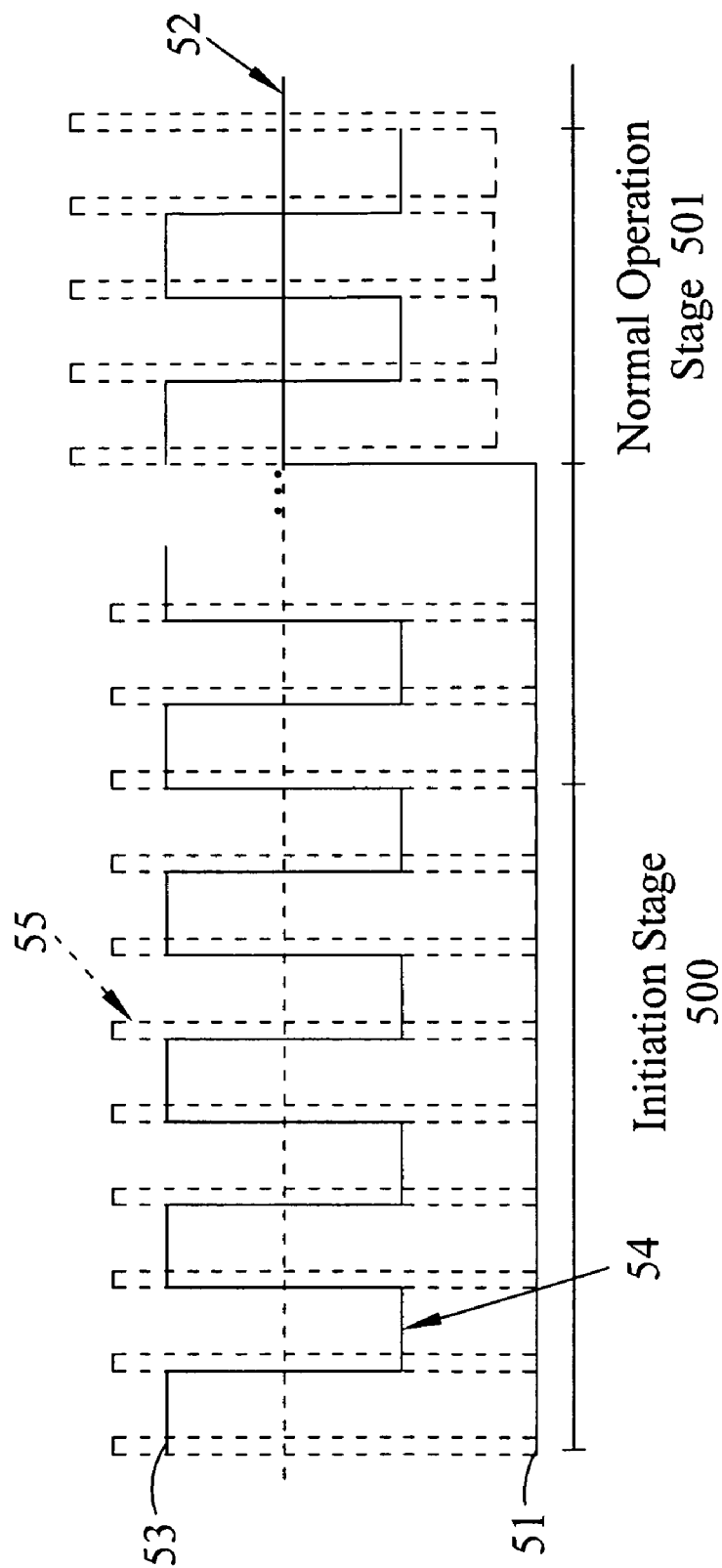
FIG. 5 is a diagram of the operation method for a pixel in a liquid crystal display device according to the present invention.

The operation method for operating a liquid crystal display device in the initiation stage is primarily based on amplitude selection driving, whose major operation theory is to use a horizontal signal and a vertical signal to provide a fixed period frequency, in which the vertical signal provides relevant display data, in combination with all horizontal signals, forming a group of frames and also taking liquid crystal response speed into consideration at the same time. Referring to FIG. 5, in which the driving relation between time and voltage is shown as two stages, a first stage and a second stage are respectively referred as an initiation stage 500 and a normal operation stage 501. Herein a low voltage (Vgl) 51, a common voltage (Vcom) 52, a high voltage (Vdh) 53, a data voltage (Vdata) 54 and a gate voltage (Vgate) 55 are provided. An externally applied voltage is inputted in the liquid crystal display device in a form of alternative current, with each pixel being serially connected to an amorphous thin film switching element; after inputting charges required by the pixel during holding time, it will be retained till charge re-input in next scan, so as to prevent the loss of the originally inputted charges before charge re-input in next scan (1/60 sec.). The initiation stage may last in a range of about 0 to 3 sec., in which the data voltage 54 generates a lateral electrical field with a voltage difference between the low voltage 51, allowing the liquid crystal arrangement transforming from a splay state into a twist state, and the data voltage 54 further generates a longitudinal electrical field with a voltage difference between the high voltage 53 and the common voltage (Vcom) 52, causing liquid crystal to transform to a bend state and the occurrence of bilateral propagation till the completion of liquid crystal transformation. During a normal operation stage, liquid crystal is kept in a bend state, and the gate voltage 55 rises to prevent excessive current leakage.

Figure 6:
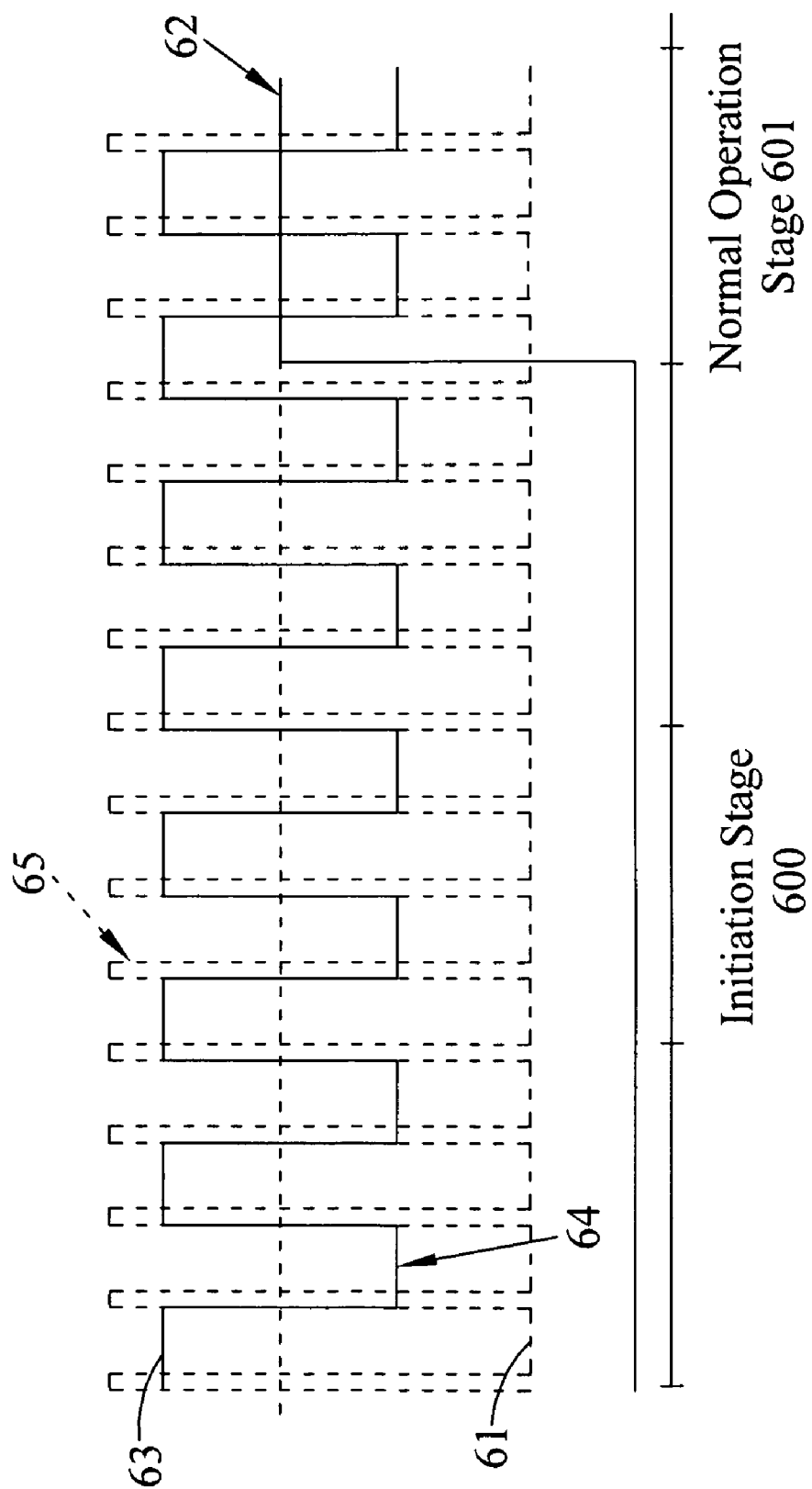
FIG. 6 is a diagram of the operation method for a pixel in a liquid crystal display device according to the present invention.
Figure 7:
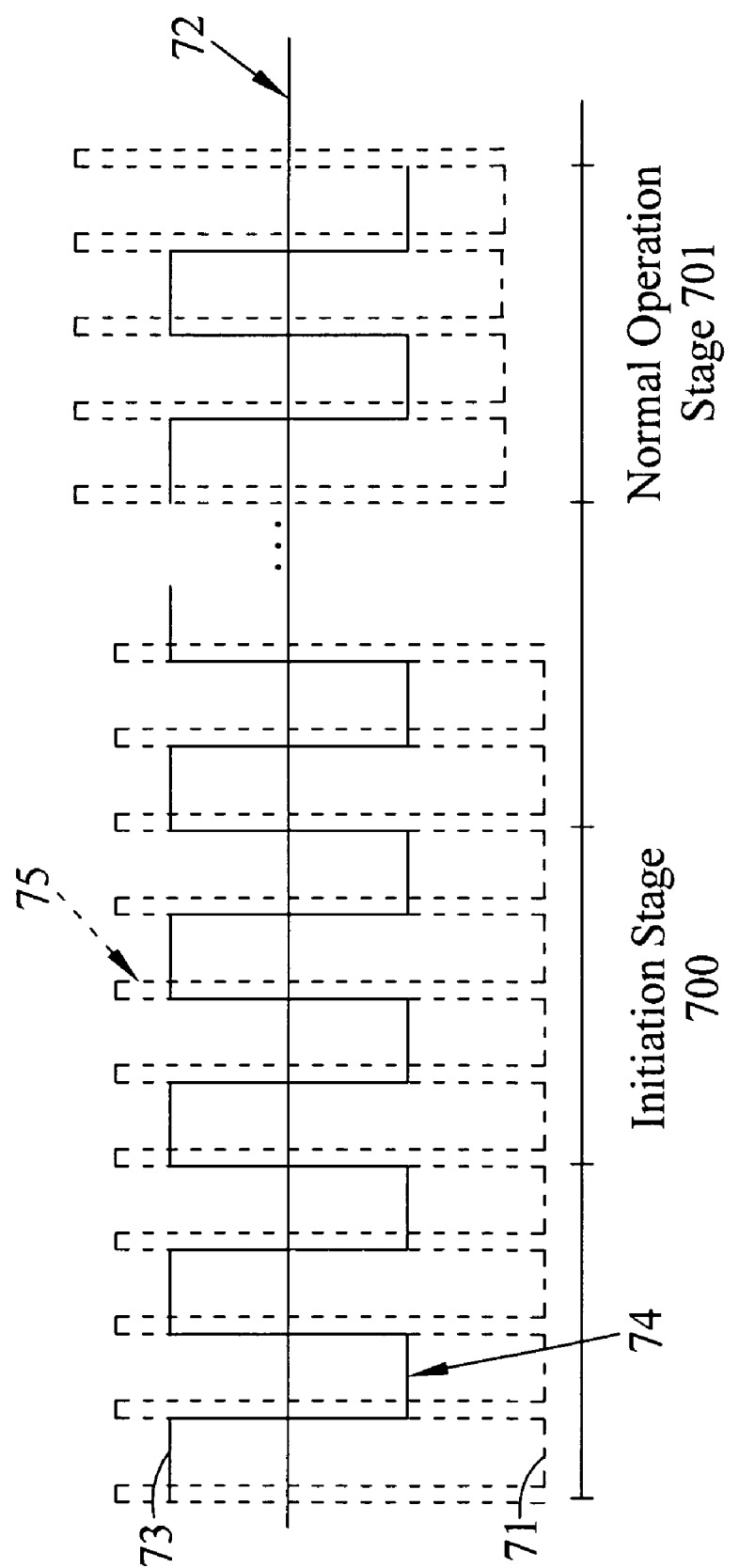
FIG. 7 is a diagram of the operation method for a pixel in a liquid crystal display device according to the present invention.
Figure 8:
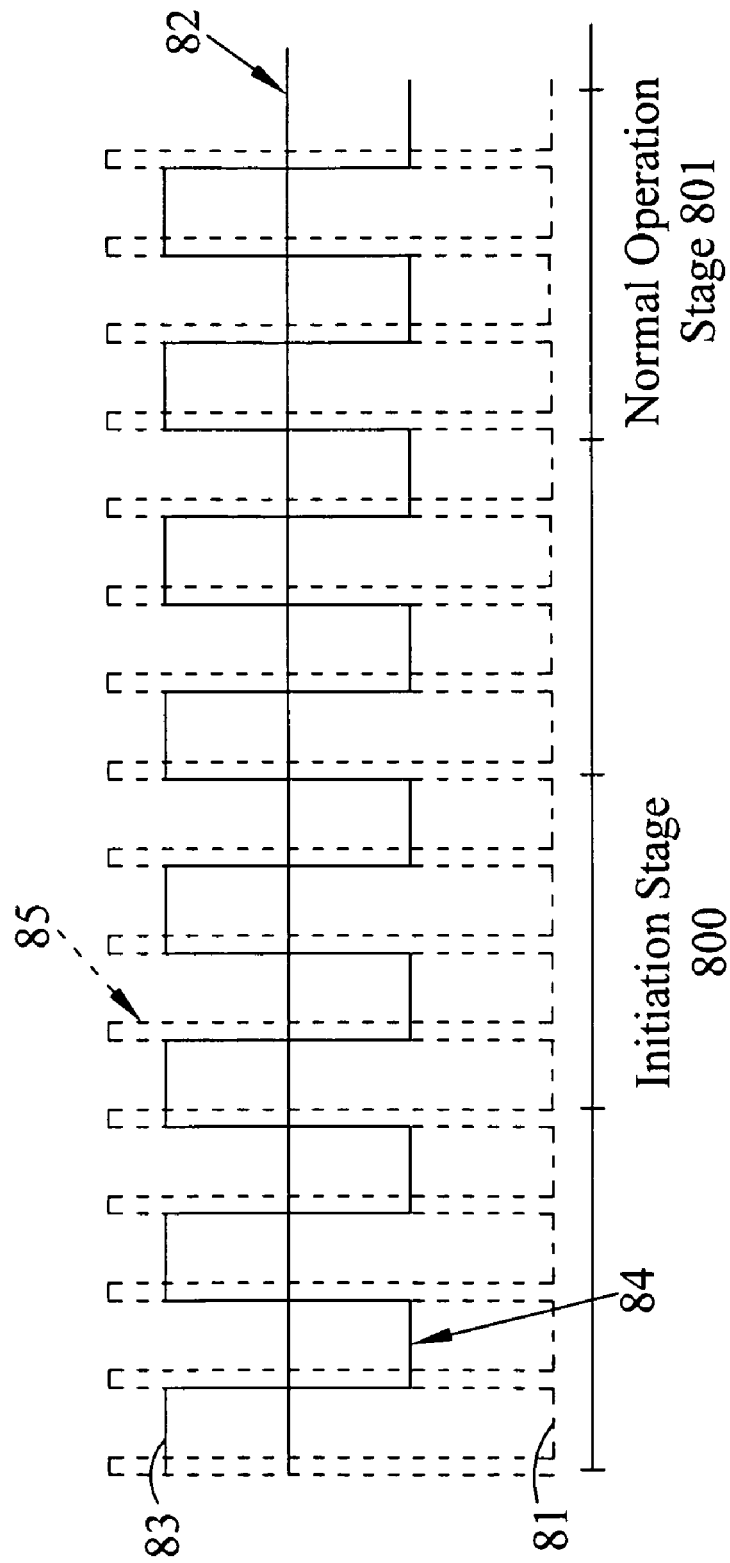
FIG. 8 is a diagram of the operation method for a pixel in a liquid crystal display device according to the present invention.

Additionally, referring to FIGS. 6, 7 and 8, by changing the variation in inputted amplitude of the external voltage level, thus changing the level of the lateral electrical field, the liquid crystal transformation speed can be further affected. As shown in FIG. 6, the low voltage (Vgl) 61 generates the smaller lateral electrical field on the data voltage (Vdata) and inputs the same gate voltage. In FIG. 7, the common voltage (Vcom) 72 does not vary during the initiation stage 700 and the normal operation stage 701, while the gate voltage (Vgate) 75 changes. In FIG. 8, the common voltage (Vcom) 82 and the gate voltage (Vgate) 85 are both provided with the same voltage to omit the initiation stage 800. The purpose thereof is primarily to simplify the system design to achieve better effects.

In summary of the aforementioned descriptions, the liquid crystal display device using the improved pixel design by employing switching element in accordance with the present invention offers the following advantages:

(1) such an improved design of the switching element can form a top by source/drain and increase the voltage difference between the source/drain and the gate so as to form a lateral electrical field;

(2) through the voltage difference between the common voltage and the pixel voltage, thereby forming a longitudinal electrical field, such an improved design of the switching element can facilitate the uniformity of liquid crystal transformation;

(3) such an improved alignment film design can accelerate transformation speed of liquid crystal in a liquid crystal display device by consistency between the arrangement in aligned direction and the direction of the top.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A liquid crystal display device, comprising:
   a first substrate and a second substrate, and a longitudinal electrical field formed there between;
   at least one pixel disposed between the first substrate and the second substrate, wherein the pixel comprises a gate line which has no extension portion;
   a plurality of liquid crystals; and
   a switching element having a gate, a drain and a source, and the drain/source extending from itself to form a directional top portion, wherein the drain is completely overlapped with the gate line;
      wherein the switching element is a bottom gate structure, and a lateral electrical field is formed between the gate and the drain/source.

2. The liquid crystal display device according to claim 1, wherein the plurality of liquid crystals comprise at least one transformation induced by variations in elastic constant, the at least one transformation including homogeneous, splay, twist and bend.

3. The liquid crystal display device according to claim 1, wherein the plurality of liquid crystals comprise nematic liquid crystal, smectic liquid crystal or cholesteric liquid crystal.

4. The liquid crystal display device according to claim 1, wherein the drain/source and the gate are partially overlapped.

5. The liquid crystal display device according to claim 1, wherein the pixel comprises a pixel electrode made of an indium tin oxide (ITO) transparent conductive film, or other transparent conductive films comprising a material selected from the group consisting of zinc oxide (ZnO), indium zinc oxide (IZO) and zinc tin oxide (ZTO).

6. The liquid crystal display device according to claim 1, wherein the switching element comprises an amorphous silicon material or a poly-silicon material.

7. The liquid crystal display device according to claim 1, wherein the directional top portion comprises an angle between 75 degrees and 105 degrees.

8. The liquid crystal display device according to claim 1, wherein the lateral electrical field is formed with a voltage difference between 15 Volts and 60 Volts.

9. A liquid crystal display device, comprising:
   a first substrate and a second substrate;
   at least one pixel disposed between the first substrate and the second substrate, wherein the pixel comprises a gate line which has no extension portion;
   a plurality of liquid crystals;
   a switching element disposed on the first substrate, the switching element having a bottom gate structure, with a gate and a drain/source forming a lateral electrical field, allowing the plurality of liquid crystals to act along the direction of the lateral electrical field, wherein the drain/source extending from itself to form a directional top portion, and the drain is completely overlapped with the gate line;
   a pixel electrode disposed on the first substrate; and
   a common electrode disposed on the second substrate, with a longitudinal electrical field formed between the common electrode and the pixel electrode, allowing the plurality of liquid crystals to act along the direction of the longitudinal electrical field;
      wherein while the lateral electrical field is formed, the plurality of liquid crystals act along the direction of the lateral electrical field thereby forming a first transformation; and while the longitudinal electrical field is formed, the plurality of liquid crystals act along the direction of the longitudinal electrical field thereby forming a second transformation.

10. The liquid crystal display device according to claim 9, wherein the plurality of liquid crystals comprise at least one transformation induced by variations in elastic constant, the at least one transformation including homogeneous, splay, twist and bend.

11. The liquid crystal display device according to claim 9, wherein the first transformation transforms from a splay transformation to a twist transformation.

12. The liquid crystal display device according to claim 9, wherein the first transformation transforms from a splay transformation or a twist transformation to a bend transformation.

13. The liquid crystal display device according to claim 9, wherein the drain/source and the gate are partially overlapped.

14. The liquid crystal display device according to claim 9, wherein the lateral electrical field is formed with a voltage difference between 15 Volts and 60 Volts.

15. An operation method for operating a liquid crystal display device in an initiation stage, comprising steps of:
providing a liquid crystal display device comprising a plurality of liquid crystals disposed between a first substrate and a second substrate, at least one pixel disposed between the first substrate and the second substrate, wherein the pixel comprises a gate line which has no extension portion, a pixel electrode disposed on the first substrate, a common electrode disposed on the second substrate, a switching element disposed on the first substrate, the switching element having a gate, a drain and a source and being a bottom gate structure, and a lateral electrical field forming between the gate and the drain/source, wherein the drain/source extending from itself to form a directional top portion, and the drain is completely overlapped with the gate line;
applying the lateral electrical field to the plurality of liquid crystals;
forming a longitudinal electrical field between the pixel electrode and the common electrode; and
applying the longitudinal electrical field to the plurality of liquid crystals, wherein a transformation speed of the plurality of liquid crystals is varied by changing amplitudes of a data voltage input and a gate voltage input.

16. The operation method according to claim 15, wherein a voltage difference is generated between the gate and the drain/source.

17. The operation method according to claim 15, wherein the lateral electrical field varies with a data voltage input and a gate voltage input.

18. The operation method according to claim 15, wherein the longitudinal electrical field varies with a data voltage input and a common voltage input.

19. The operation method according to claim 18, wherein transformation speed of the plurality of liquid crystals is varied by changing amplitudes of the data voltage input and the common voltage input.

* * * * *